United States Patent
Zhang et al.

(10) Patent No.: US 10,892,962 B2
(45) Date of Patent: Jan. 12, 2021

(54) INTER-CHANNEL LINEAR CROSSTALK ESTIMATION METHOD AND APPARATUS AND RECEIVER

(71) Applicant: FUJITSU LIMITED, Kawasaki (JP)

(72) Inventors: Ke Zhang, Beijing (CN); Xiaofei Su, Beijing (CN); Yangyang Fan, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 188 days.

(21) Appl. No.: 16/136,817

(22) Filed: Sep. 20, 2018

(65) Prior Publication Data

US 2019/0104036 A1    Apr. 4, 2019

(30) Foreign Application Priority Data

Sep. 30, 2017 (CN) .......................... 2017 1 0919677

(51) Int. Cl.
*H04L 12/26* (2006.01)
*H04B 10/079* (2013.01)
*H04L 7/00* (2006.01)

(52) U.S. Cl.
CPC ....... *H04L 43/028* (2013.01); *H04B 10/0795* (2013.01); *H04L 7/0087* (2013.01)

(58) Field of Classification Search
CPC .. H04L 43/028; H04L 7/0087; H04B 10/0795
(Continued)

(56) References Cited

U.S. PATENT DOCUMENTS 6,982,937 B2 * 1/2006 Kanaoka ................ G11B 7/005
                                                        369/47.17
7,778,550 B2 * 8/2010 Zhang .................. H04B 10/572
                                                        398/196
(Continued)

FOREIGN PATENT DOCUMENTS

CN      103338171 A      10/2013
CN      103812806 A       5/2014
(Continued)

OTHER PUBLICATIONS

Su et al., An Accurate Algorithm to Quantitatively Identify the Performance Degradation Caused by Linear Crosstalk, 2018 Optical Fiber Communications Conference and Exposition (OFC), Mar. 2018 (Year: 2018).*

(Continued)

*Primary Examiner* — David P Zarka
(74) *Attorney, Agent, or Firm* — Staas & Halsey, LLP

(57) ABSTRACT

An inter-channel linear crosstalk estimation method and apparatus and a communication system are disclosed. The apparatus includes: an adjacent channel synchronizing unit configured to synchronize adjacent channel information inserted with a cyclic training sequence in a received signal, to determine a time window of occurrence of the cyclic training sequence; a time domain cutoff unit configured to perform time cutoff on center channel information in the received signal according to the time window of occurrence of the cyclic training sequence, to obtain center channel information within the same time window as the cyclic training sequence; a filtering unit configured to filter the center channel information within the time window, and reserve center channel information containing linear crosstalk from an adjacent channel; and a linear crosstalk estimating unit configured to estimate a magnitude of linear (Continued)

crosstalk leaking into the center channel by using a cyclic characteristic of the cyclic training sequence.

19 Claims, 8 Drawing Sheets

(58) Field of Classification Search
USPC .......................................................... 709/224
See application file for complete search history.

(56) References Cited

U.S. PATENT DOCUMENTS

| | | | |
|---|---|---|---|
| 7,809,070 B2* | 10/2010 | Ashikhmin | H04B 3/487 |
| | | | 375/260 |
| 8,655,195 B2* | 2/2014 | Yan | H04B 10/6162 |
| | | | 398/211 |
| 9,009,035 B2* | 4/2015 | Tsujikawa | G10L 21/0272 |
| | | | 381/94.1 |
| 9,673,894 B2* | 6/2017 | Gariepy | H04B 10/0795 |
| 9,722,664 B2* | 8/2017 | Nuzman | H04L 25/0222 |
| 9,825,699 B2* | 11/2017 | Zhao | H04L 1/0048 |
| 9,832,083 B2* | 11/2017 | Zhao | H04B 10/07957 |
| 9,859,977 B2* | 1/2018 | Zhao | H04B 10/07955 |
| 9,985,801 B2* | 5/2018 | Zhao | H04L 25/0224 |
| 10,491,294 B2* | 11/2019 | Li | H04L 27/0014 |
| 10,623,128 B2* | 4/2020 | Li | H04J 14/0256 |
| 2015/0222357 A1* | 8/2015 | Habel | H04J 14/0272 |
| | | | 398/26 |
| 2016/0156383 A1 | 6/2016 | Nuzman et al. | |
| 2016/0329978 A1 | 11/2016 | Zukunft et al. | |
| 2017/0005700 A1 | 1/2017 | Cendrillon et al. | |
| 2017/0104643 A1 | 4/2017 | Zhao et al. | |
| 2017/0134569 A1 | 5/2017 | Tu et al. | |

FOREIGN PATENT DOCUMENTS

| | | |
|---|---|---|
| CN | 105099968 A | 11/2015 |
| CN | 105453501 | 3/2016 |
| CN | 105453502 | 3/2016 |
| CN | 106572044 A | 4/2017 |
| CN | 106789776 A | 5/2017 |
| EP | 3 200 354 A1 | 8/2017 |
| WO | WO 2012/162830 A1 | 12/2012 |
| WO | WO 2016/077991 A1 | 5/2016 |

OTHER PUBLICATIONS

Tao et al., Transmission Characteristics Monitoring by Digital Signal Processing in Coherent Receiver, 2018 23rd Opto-Electronics and Communications Conference (OECC), Jul. 2018 (Year: 2018).*

Zhao et al., Accurate and Robust Channel Spacing Estimation Based on Periodic Training Sequence in Denser Nyquist-WDM System, 42nd European Conference and Exhibition on Optical Communications, 16-18 (Sep. 18, 2016) (Year: 2016).*

Zhao et al., Channel Spacing Monitor Based on Periodic Training Sequence in DWDM System, Journal of Lightwave Technology, vol. 35, No. 8, 1422-28 (Apr. 15, 2017) (Year: 2017).*

Yan et al., Experimental Investigation of Training Sequence for Adaptive Equalizer Initialization in DP-16QAM System, 39th European Conference and Exhibition on Optical Communication, pp. 1-3 (Sep. 2013) (Year: 2013).*

Zhao et al., Frequency Domain DSP Based Channel Spacing Monitor in Denser Nyquist-WDM System, 2015 European Conference on Optical Communication (Sep. 2015) (Year: 2015).*

Xinling Liu et al., "A brief analysis of crosstalk in WDM all-optical network", China Academic Journal Electronic Publishing House, Issue 16, 2012.

Chinese Office Action dated Oct. 30, 2020 in Chinese Patent Application No. 201710919677.9.

* cited by examiner

FIG. 12
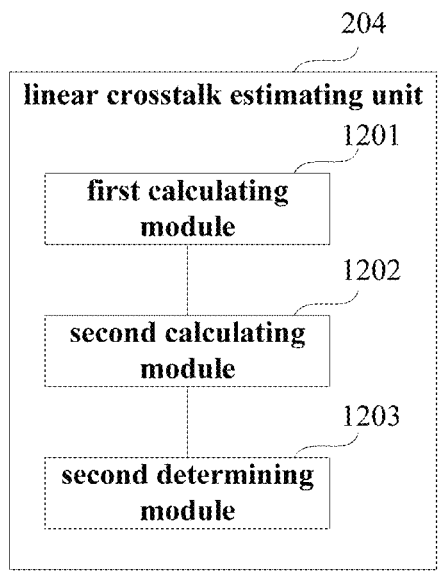
FIG. 13
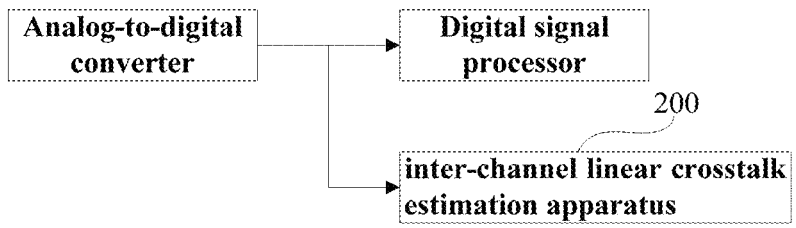
FIG. 14
1401
a magnitude of linear crosstalk leaking into a center channel is estimated by using training sequence information of an adjacent channel; wherein, the training sequence of the adjacent channel is a cyclic training sequence

INTER-CHANNEL LINEAR CROSSTALK ESTIMATION METHOD AND APPARATUS AND RECEIVER

CROSS-REFERENCE TO RELATED APPLICATIONS

This application claims the benefit of Chinese Patent Application No. 201710919677.9, filed Sep. 30, 2017, in the State Intellectual Property Office of China, the disclosure of which is incorporated herein by reference.

BACKGROUND

1. Field

This disclosure relates to the field of communication technologies, and in particular to an inter-channel linear crosstalk estimation method and apparatus and a receiver.

2. Description of the Related Art

In recent years, high-speed data traffic has been developing quickly, such as high-definition videos, mobile Internet, and cloud computing, having higher and higher requirements on capacities of communication systems, and such requirements greatly push forward development of fiber-optic communication systems represented by dense wavelength division multiplexing (DWDM) technology. One of methods for increasing the communication capacity of DWDM transmission system is to increase the number of multiplexed wavelength channels, one of its implementations being to further reduce frequency spacing between neighboring optical wavelength channels, which will inevitably induce inter-channel linear crosstalk and adversely affect the performance of transmission systems of high bit rates. Hence, for a typical DWDM transmission system, for further improving its transmission capability, it is necessary to perform accurate and effective monitoring of the inter-channel linear crosstalk.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that most existing inter-channel linear crosstalk estimation methods are carried out in an indirect measurement manner. For example, the amount of crosstalk can be coarsely estimated by monitoring channel spacings; however, this is only an indirectly estimation method. For another example, a root raised cosine filter of a roll-off rate 0.1% is used in a DP-16QAM system of 10 GBaud to reduce affection brought about by linear crosstalk; however, such a method is unable to estimate the amount of linear crosstalk.

In order to solve the above problems, embodiments of this disclosure provide an inter-channel linear crosstalk estimation method and apparatus and a receiver.

According to a first aspect of the embodiments of this disclosure, there is provided an inter-channel linear crosstalk estimation apparatus, including:

an adjacent channel synchronizing unit or synchronizer configured to synchronize adjacent channel information inserted with a cyclic training sequence in a received signal, to determine a time window of occurrence of the cyclic training sequence;

a time domain cutoff unit or device configured to perform time cutoff on center channel information in the received signal according to the time window of occurrence of the cyclic training sequence, to obtain center channel information within the same time window as the cyclic training sequence;

a first filtering unit or filter configured to filter the center channel information within the time window, and reserve center channel information containing linear crosstalk from an adjacent channel; and a linear crosstalk estimating unit or estimator configured to estimate a magnitude of linear crosstalk leaking into the center channel by using a cyclic characteristic of the cyclic training sequence.

According to a second aspect of the embodiments of this disclosure, there is provided an inter-channel linear crosstalk estimation method, including:

estimating a magnitude of linear crosstalk leaking into a center channel by using information on a training sequence of an adjacent channel; wherein, the training sequence of the adjacent channel is a cyclic training sequence.

According to a third aspect of the embodiments of this disclosure, there is provided a receiver, including the apparatus as described in the first aspect.

According to a fourth aspect of the embodiments of this disclosure, there is provided a computer readable program storable in a non-transitory computer readable storage, which, when executed in a receiver, will cause the receiver to carry out the method as described in the second aspect.

According to a fifth aspect of the embodiments of this disclosure, there is provided a computer storage medium, including a computer readable program, which will cause a receiver to carry out the method as described in the second aspect.

An advantage of the embodiments of this disclosure exists in that with the inter-channel linear crosstalk estimation method and apparatus, the center channel is first filtered to obtain effective information containing the adjacent channel crosstalk, and at the same time, the cyclic characteristic of the training sequence is used to locate the position of the training sequence of the adjacent channel, thereafter, the center channel signal containing the adjacent channel crosstalk is performed time cutoff and filtered again, and finally, by using the characteristic that the data transmitted in the center channel are random symbols and the data transmitted in the adjacent channel are cyclic sequences, crosstalk components having cyclic characteristics are extracted from the center channel to achieve monitoring the inter-channel linear crosstalk.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

Additional aspects and/or advantages will be set forth in part in the description which follows and, in part, will be apparent from the description, or may be learned by practice of the invention.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 12 is a schematic diagram of an implementation of a linear crosstalk estimating unit in the estimation apparatus of Embodiment 1;

FIG. 13 is a schematic diagram of an implementation of a configuration position of the estimation apparatus of Embodiment 1;

FIG. 14 is a schematic diagram of an implementation of the estimation method of Embodiment 2;

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, description shall be given by taking linear crosstalk estimation of an optical receiver in a fiber-optic communication system as an example. However, it is illustrative only, and is not intended to limit this disclosure, and the embodiments of this disclosure are applicable to all communication systems having linear crosstalk, and not only limited to fiber-optic communication systems.

Figure 1:
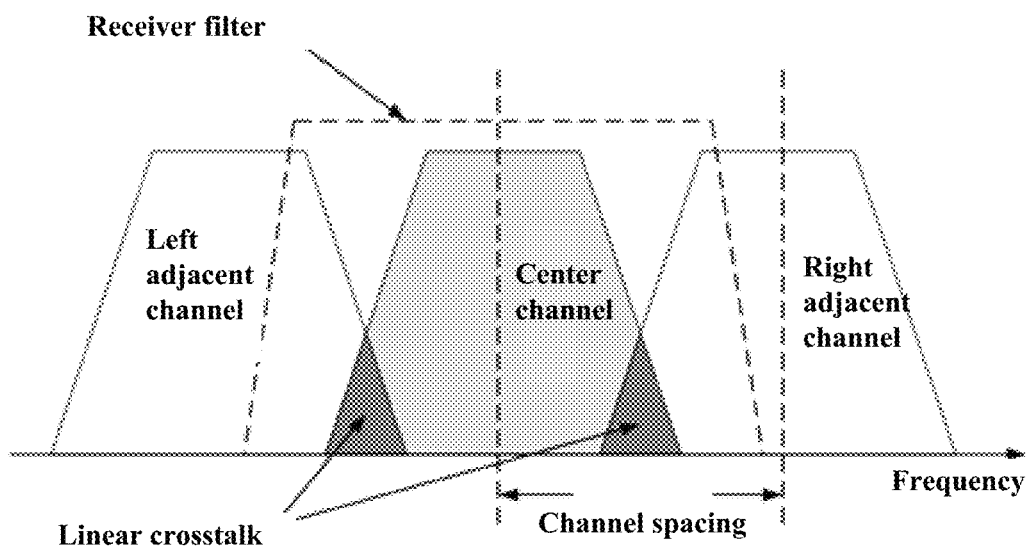
FIG. 1 is a schematic diagram of signals received by an optical receiver.

FIG. 1 is a schematic diagram of signals received by the optical receiver. As shown in FIG. 1, for the optical receiver having a certain operational bandwidth, information received by it includes, in addition to needed center channel information, information on a part of adjacent channels within the bandwidth of the receiver. And when guard spacings between the adjacent channels are relatively small, information on a part of adjacent channels will leak into the center channel, which has an effect on the center channel information, and results in degradation of final center channel signals obtained by demodulation.

The embodiments of this disclosure shall be described below with reference to the accompanying drawings.

Embodiment 1

Figure 2:
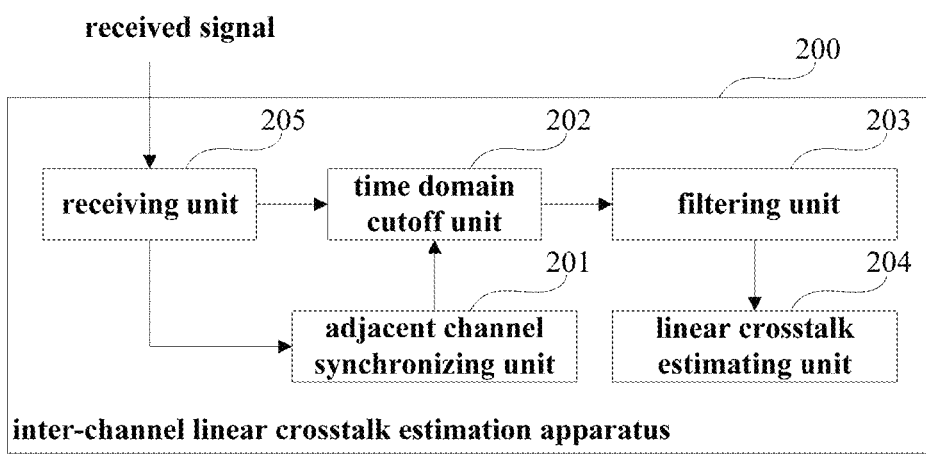
FIG. 2 is a schematic diagram of the estimation apparatus of Embodiment 1.

The embodiment of the present disclosure provides an inter-channel linear crosstalk estimation apparatus. FIG. 2 is a schematic diagram of the estimation apparatus 200. As shown in FIG. 2, the estimation apparatus 200 includes an adjacent channel synchronizing unit 201, time domain cutoff unit 202, a filtering unit 203 and a linear crosstalk estimating unit 204. The adjacent channel synchronizing unit 201 synchronizes adjacent channel information inserted with a cyclic training sequence in a received signal, to determine a time window of occurrence of the cyclic training sequence; the time domain cutoff unit 202 performs time cutoff on center channel information in the received signal according to the time window of occurrence of the cyclic training sequence, to obtain center channel information within the same time window as the cyclic training sequence; the filtering unit 203 filters the center channel information within the time window, and reserves center channel information containing linear crosstalk from an adjacent channel; and the linear crosstalk estimating unit 204 estimates a magnitude of linear crosstalk leaking into the center channel by using a cyclic characteristic of the cyclic training sequence.

With the apparatus of this embodiment, the magnitude of linear crosstalk leaking into the center channel is estimated by using the information on the cyclic training sequence in the adjacent channel, and monitoring the inter-channel linear crosstalk is achieved.

In this embodiment, as shown in FIG. 2, the estimation apparatus 200 may further include a receiving unit 205 configured to receive a signal containing the center channel information and the adjacent channel information, the adjacent channel information having been inserted with the cyclic training sequence. It should be noted that the receiving unit 205 is provided in a sense of functionality, and in practical implementations, the receiving unit 205 may not be provided, and the above signals are received directly from a receiver.

Figure 3:
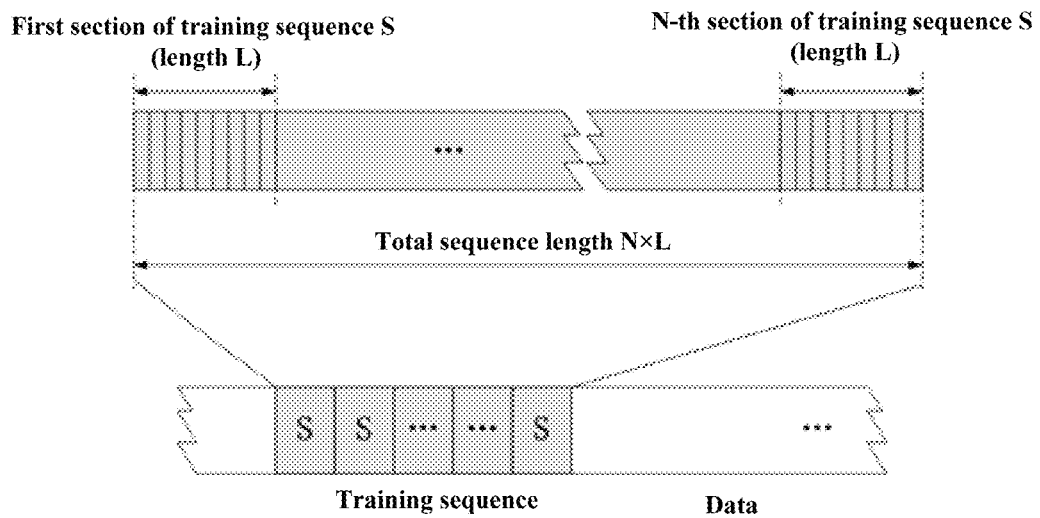
FIG. 3 is a schematic diagram of an implementation of a cyclic training sequence.

In this embodiment, the cyclic training sequence consists of one or more sequence sections, each section including a plurality of temporally repeated data symbols, adjacent sequence sections being connected to each other in an end to end manner. And other information may also be inserted between the adjacent sequence sections. FIG. 3 is a schematic diagram of an example of the cyclic training sequence. As shown in FIG. 3, the cyclic training sequence contains N sections of repeated sequences S, each section of sequence S consisting of L data symbols; wherein, S and S are connected to each other in an end to end manner. By using the cyclic characteristic of the training sequence, the time window of occurrence of the training sequence in the adjacent channel may be determined, and the magnitude of the linear crosstalk component leaking into the center channel may be estimated.

In this embodiment, the adjacent channel synchronizing unit 201 is configured to perform synchronization of the cyclic training sequence, to determine the time window of occurrence of the cyclic training sequence.

Figure 4:
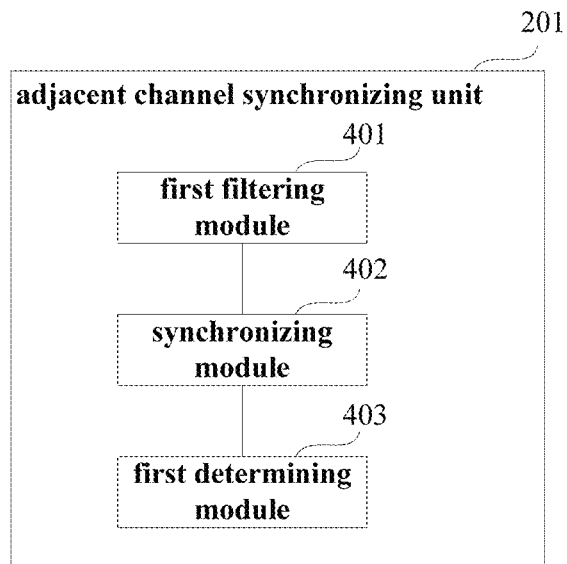
FIG. 4 is a schematic diagram of an implementation of an adjacent channel synchronizing unit in the estimation apparatus of Embodiment 1.

FIG. 4 is a schematic diagram of an implementation of the adjacent channel synchronizing unit 201. As shown in FIG. 4, the adjacent channel synchronizing unit 204 may include a first filtering module 401, a synchronizing module 402 and a first determining module 403. The first filtering module 401 filters the received signal, to filter out the center channel information and reserve the adjacent channel information; the synchronizing module 402 synchronizes the adjacent channel information according to the cyclic characteristic of the cyclic training sequence, to determine a position of the cyclic training sequence in the adjacent channel information; and the first determining module 403 determines the time window of occurrence of the cyclic training sequence according to the position of the cyclic training sequence in the adjacent channel information.

Figure 5:
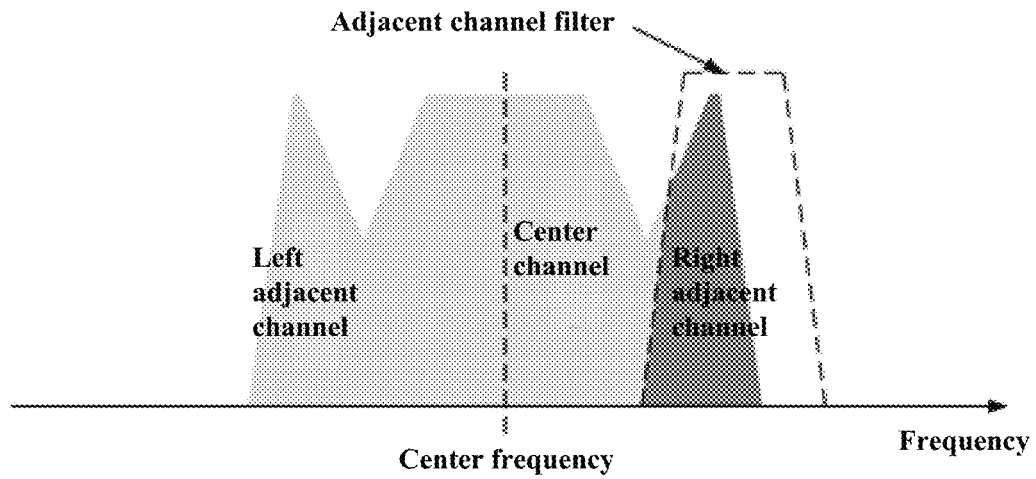
FIG. 5 is a schematic diagram of an implementation of an adjacent channel filter.

In this implementation, an aim of the adjacent channel synchronization is to find a position of the cyclic training sequence in the adjacent channel in a time domain. First, the signals received by the received are filtered by the first filtering module 401 (an adjacent channel filter shown in FIG. 5), to filter the center channel information and reserve the adjacent channel information, as shown in FIG. 5. Then, a particular position of the cyclic training sequence is found by the synchronizing module 402 by using the cyclic characteristic of the cyclic training sequence in the adjacent channel.

In this implementation, an implementation manner of the synchronizing module 402 is not limited. In one implementation, it may be implemented by performing an autocorrelation after latency by L symbols. Following is a particular calculation formula:

$$\mathrm{corr}(j) = \sum_{i=j}^{j+L-1} (S_i \cdot S_{i+2}^*);$$

where, $S_i$ denotes an i-th symbol of a signal sequence, L is a symbol period of a training sequence, corr(j) is a correlation value obtained after an autocorrelation is performed on a j-th symbol.

Then, cyclic left shift and sequence addition are performed on a sequence corr(j), and a position to which a peak value element of the obtained sequence corresponds is an initial position of the cyclic training sequence; or cyclic right shift and sequence addition are performed on the sequence corr(j), and a position to which a peak value element of the obtained sequence corresponds is a cutoff position of the cyclic training sequence.

In this implementation, a particular position (such as the above initial position or cutoff position) of the cyclic training sequence is obtained, and with reference to known information on a length of the training sequence, the time window of occurrence of the cyclic training sequence may be determined by the first determining module 403.

In this implementation, the time domain cutoff unit 202 may first filter the center channel to desert redundancy information, and then perform time cutoff on the filtered signals, to obtain the center channel information within the same time window as the cyclic training sequence in the adjacent channel. The filtering operation herein may be optional, and the time domain cutoff unit 202 may also perform the above time cutoff directly on the signals received by the receiver.

Figure 6:
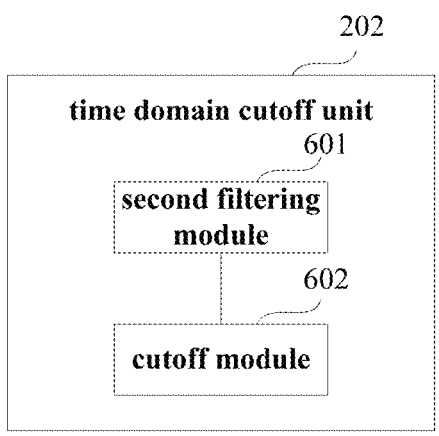
FIG. 6 is a schematic diagram of an implementation of a time domain cutoff unit in the estimation apparatus of Embodiment 1.

FIG. 6 is a schematic diagram of an implementation of the time domain cutoff unit 202. As shown in FIG. 6, the time domain cutoff unit 202 may include a second filtering module 601 and a cutoff module 602. The second filtering module 601 filters the center channel information in the received signals, and the cutoff module 602 performs time cutoff on the filtered center channel information according to the time window of occurrence of the cyclic training sequence determined by the adjacent channel synchronizing unit, to obtain the center channel information within the same time window as the cyclic training sequence.

Figure 7:
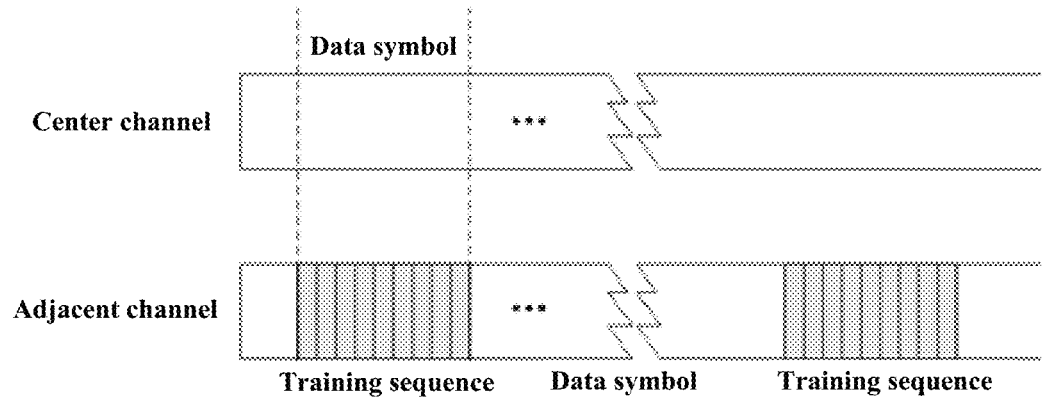
FIG. 7 is a schematic diagram of time domain cutoff based on a training sequence.

FIG. 7 is a schematic diagram of time domain cutoff based on the training sequence. As shown in FIG. 7, the cutoff module 602 performs time cutoff on a filtered primary signal (the center channel information) according to the time window of the training sequence of the adjacent channel obtained through the adjacent channel synchronization, to obtain the center channel information containing leaked training sequence components of the adjacent channel.

In this embodiment, after the center channel information containing leaked training sequence components of the adjacent channel (the center channel information within the above time window) is obtained, the filtering unit 203 may filter the information, and reserve center channel information containing linear crosstalk from the adjacent channel. Such information may be used for estimating the magnitude of the linear crosstalk, and is effective information. And with the operations of the filtering unit 203, unnecessary center channel information may be filtered out.

In one implementation, a type of a filter used by the filtering unit 203 may be an all-pass filter, or may be fixed filter, such as a matched filter, or a band-pass filter, the type of the filter is not limited in this embodiment. And a type of a filter used by the second filtering module 601 may be identical to or different from that of the filter used by the filtering unit 203.

Principles of operations of an all-pass filter, a matched filter and a band-pass filter shall be described below respectively.

Figure 8:
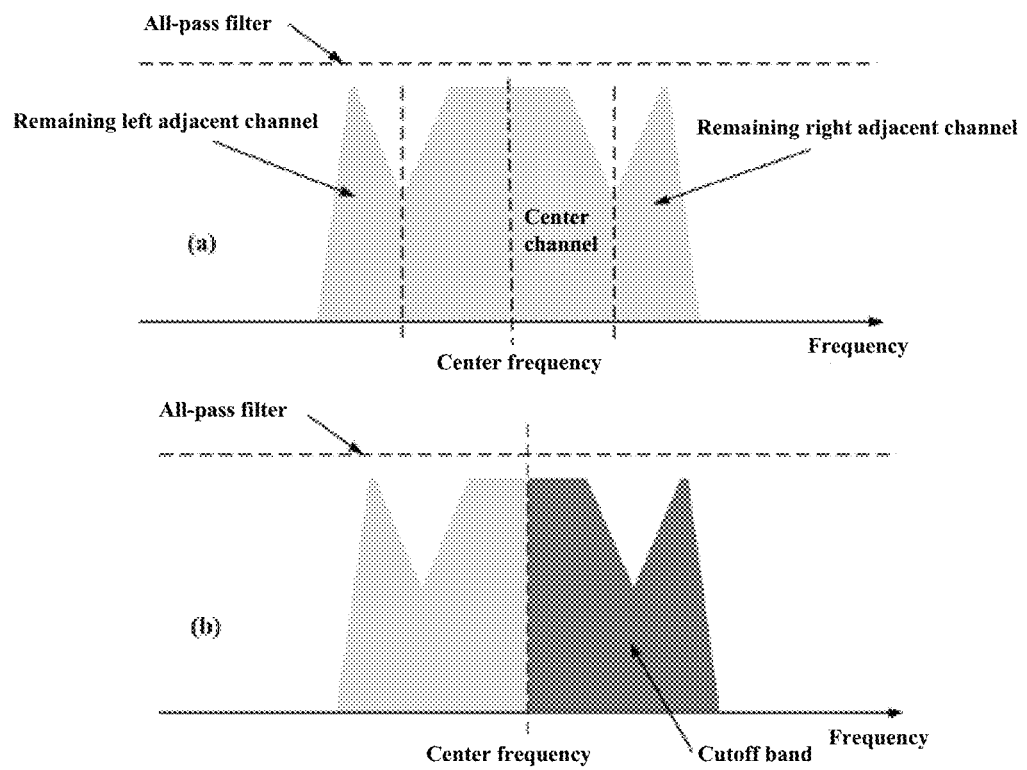
FIG. 8 is a schematic diagram of two implementations of a principle of operations of an all-pass filter.

FIG. 8 is a schematic diagram of a principle of operations of an all-pass filter, in which (a) in FIG. 8 gives a signal spectrum after all-pass filtering is performed on the center channel, containing wholly-reserved center channel information and left adjacent channel information and right adjacent channel information that are partially reserved due to limited bandwidth of the receiver. It may be found through comparison with FIG. 1 that, almost all inter-channel linear crosstalk is reserved without being damaged, hence, it may be used for estimating a magnitude of total linear crosstalk.

In this implementation, when it is needed to monitor magnitudes of crosstalk of individual adjacent channel (such as the left adjacent channel and right adjacent channel) band cutoff may further be performed on the filtered center channel. As shown in (b) in FIG. 8, in order to estimate a magnitude of linear crosstalk introduced by the right adjacent channel, a right half band of a spectrum in the received signals of the receiver is only cut off, and the whole process is equivalent to performing a time of high-pass filtering immediately after performing all-pass filtering on the center channel. On the contrary, in order to estimate a magnitude of linear crosstalk introduced by the left adjacent channel, a left half band may be cut off for analysis. The two processing manners of estimating the total linear crosstalk and the linear crosstalk introduced by the individual channel are not differentiated in this embodiment, except otherwise specified.

Figure 9:
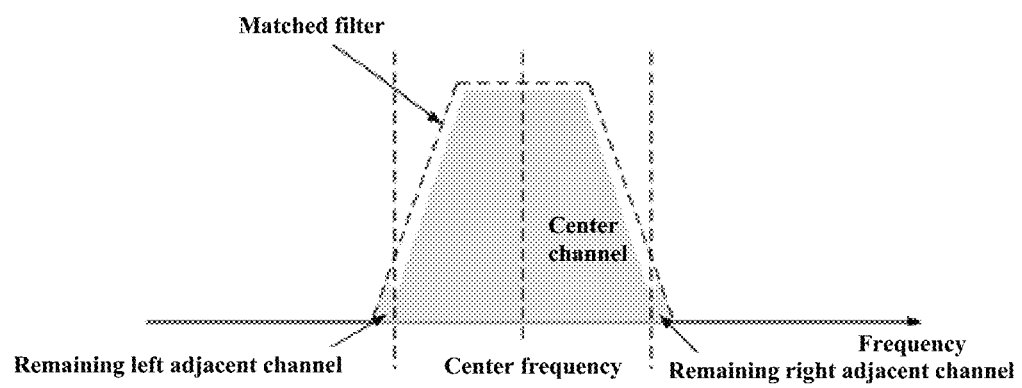
FIG. 9 is a schematic diagram of an implementation of a principle of operations of a matched filter.

FIG. 9 is a schematic diagram of a principle of operations of a matched filter. As shown in FIG. 9, after matched filtering, effective information of the center channel is reserved and adjacent channel crosstalk is suppressed, and an effect of the estimated adjacent channel crosstalk on the center channel is more direct.

Figure 10:
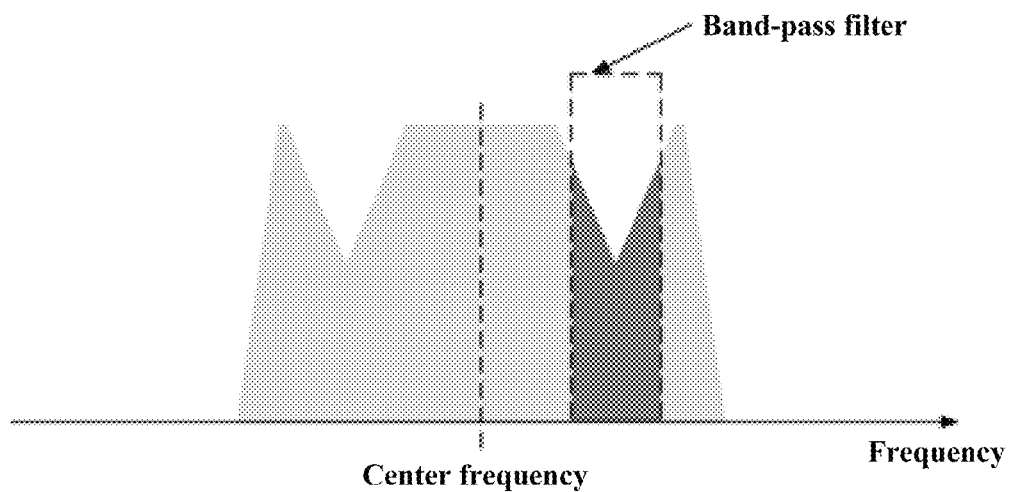
FIG. 10 is a schematic diagram of an implementation of a principle of operations of a band-pass filter.

FIG. 10 is a schematic diagram of a principle of operations of a band-pass filter. As shown in FIG. 10, as the linear crosstalk is an area where spectra of the center channel signals and the adjacent channel signals are mixed and its spectra are mainly distributed in a roll-off part of a primary signal and a part of the adjacent channel close to the primary signal, band-pass filtering may further be performed on the center channel, and band components containing linear crosstalk are only reserved. As shown in FIG. 10, the dark shadowed area is a primary band component obtained by filtering and containing the linear crosstalk introduced by the right adjacent channel. And at this moment of time, relatively obvious signal components having the cyclic characteristics of the training sequences of the adjacent channels may be extracted by the linear crosstalk estimating unit 204.

Figure 11:
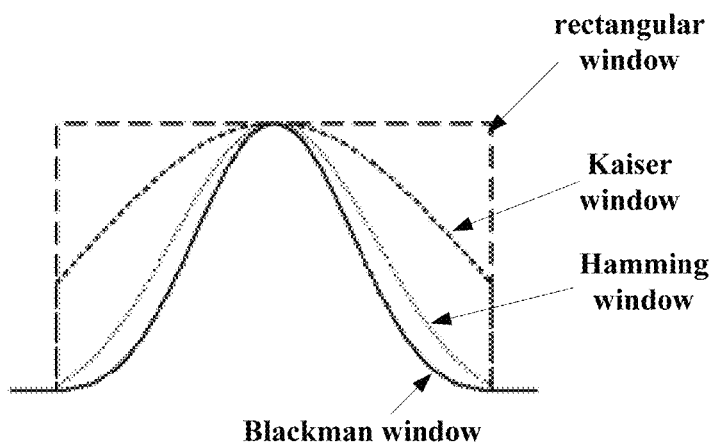
FIG. 11 is a schematic diagram of several window functions used by the band-pass filter.

In this implementation, it is taken into account that in performing band-pass filtering on the center channel, in addition to the linear crosstalk, information on payloads of a part of center channels is reserved. In order to reduce effects of leaked information on a result of estimation of the linear crosstalk, a windowing operation may be performed on the used band-pass filter. FIG. 11 is a schematic diagram of several examples of the window function used by the band-pass filter, including a rectangular window, or a Kaiser window, or a Hamming window, or a Blackman window; however, it is not limited thereto. And window functions used in operations of different band-pass filters may be identical or different. Furthermore, in this implementation, a windowing process may be performed in a frequency domain, or may be performed in a time domain in an equivalent manner, and a particular implementation is not limited herein.

In this implementation, after obtaining the center channel information containing the linear crosstalk from the adjacent channel leaking into the center channel by the filtering unit 203, the magnitude of the linear crosstalk may be estimated by the linear crosstalk estimating unit 204 by using the cyclic characteristic of the crosstalk signal.

FIG. 12 is a schematic diagram of an implementation of the linear crosstalk estimating unit 204. As shown in FIG. 12, the linear crosstalk estimating unit 204 may include a first calculating module 1201, a second calculating module 1202 and a second determining module 1203. The first calculating module 1201 performs an autocorrelation on the center channel information within the above time window by taking L symbol intervals as a cycle, L being the cycle of the cyclic training sequence; the second calculating module 1202, according to a plurality of correlation values with lengths equivalent to a length of the cyclic training sequence appearing after the autocorrelation, calculates a mean value of the plurality of correlation values; and the second determining module 1203 may calculate magnitude of cyclic component in the center channel within the above time window according to a ratio of the mean value of the plurality of correlation values to power of the center channel information, and then determine the magnitude of linear crosstalk leaking into the center channel within the time window.

In this implementation, in the cutoff time window, what are transmitted in the center channel are random data symbols and what are transmitted in the adjacent channel are the training sequence having a cyclic characteristic, hence, the adjacent channel information leaking into the center channel is a cyclic training sequence differentiated from the primary signal, that is, the magnitude of the inter-channel linear crosstalk may be estimated via strength and weakness of a cyclic characteristic of the center channel in the cutoff time window. In this implementation, after the autocorrelation is performed on the center channel sequence by taking L symbol intervals as a cycle, a plurality of correlation values with lengths equivalent to a length of the training sequence will appear, and the magnitude of the linear crosstalk may be estimated by calculating a ratio of a mean value of these correlation values to signal mean power (power of the center channel information).

In this embodiment, the inter-channel linear crosstalk estimation apparatus may be provided in a receiver, or may be provided in another entity independent of a receiver and a digital signal processor. FIG. 13 shows an example that the inter-channel linear crosstalk estimation apparatus 200 is provided out of a receiver. In this example, the inter-channel linear crosstalk estimation apparatus 200 is located after an analog-to-digital converter of the receiver, and functions implemented by the apparatus 200 and operations of the digital signal processor are independent to each other and have no effect on each other; however, this embodiment is not limited thereto.

With the apparatus of this embodiment, the center channel information is filtered, and the effective information that may be used for estimating the magnitude of the inter-channel linear crosstalk is reserved, thereby improving accuracy of estimation of the linear crosstalk.

Embodiment 2

The embodiment of the present disclosure provides an inter-channel linear crosstalk estimation method. As principles of the method for solving problems are similar to that of the apparatus in Embodiment 1, the implementation of the apparatus in Embodiment 1 may be referred to for implementation of the method, with identical contents being not going be described herein any further.

FIG. 14 is a schematic diagram of an implementation of the estimation method of inter-channel linear crosstalk of this embodiment. As shown in FIG. 14, the estimation method includes:

step 1401: a magnitude of linear crosstalk leaking into a center channel is estimated by using information a training sequence of an adjacent channel; wherein, the training sequence of the adjacent channel is a cyclic training sequence.

In this embodiment, the magnitude of the linear crosstalk leaking into the center channel from the adjacent channel may be estimated by using the cyclic characteristic of training sequence of the adjacent channel.

Figure 15:
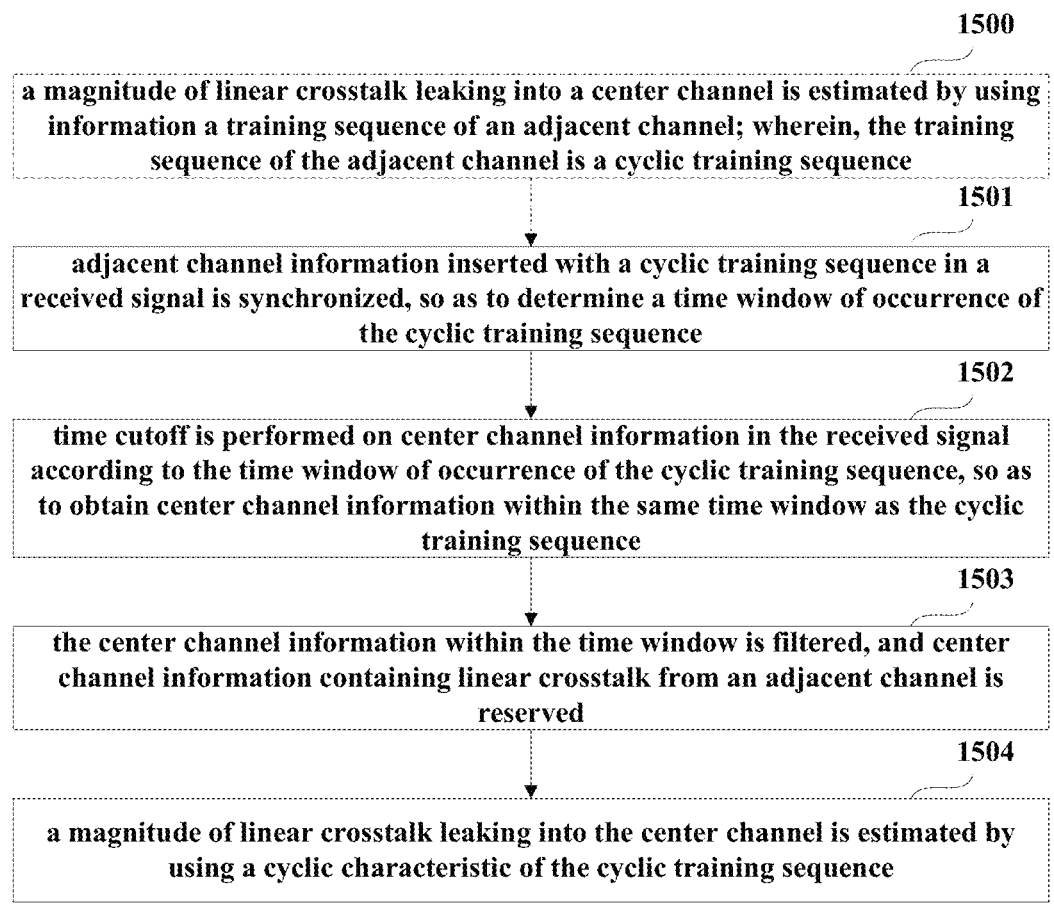
FIG. 15 is a schematic diagram of another implementation of the estimation method of Embodiment 2.

FIG. 15 is a schematic diagram of another implementation of the estimation method of inter-channel linear crosstalk of this embodiment. As shown in FIG. 15, the estimation method includes:

step 1501: adjacent channel information inserted with a cyclic training sequence in a received signal is synchronized, to determine a time window of occurrence of the cyclic training sequence;

step 1502: time cutoff is performed on center channel information in the received signal according to the time window of occurrence of the cyclic training sequence, to obtain center channel information within the same time window as the cyclic training sequence;

step 1503: the center channel information within the time window is filtered, and center channel information containing linear crosstalk from an adjacent channel is reserved; and step 1504: a magnitude of linear crosstalk leaking into the center channel is estimated by using a cyclic characteristic of the cyclic training sequence.

In this implementation, as shown in FIG. 15, the estimation method may further include:

step 1500: a signal containing the center channel information and the adjacent channel information is received, the adjacent channel information having been inserted with the cyclic training sequence.

In this embodiment, the cyclic training sequence consists of one or more sequence sections, each section including a plurality of temporally repeated data symbols, adjacent sequence sections being connected to each other in an end to end manner.

Figure 16:
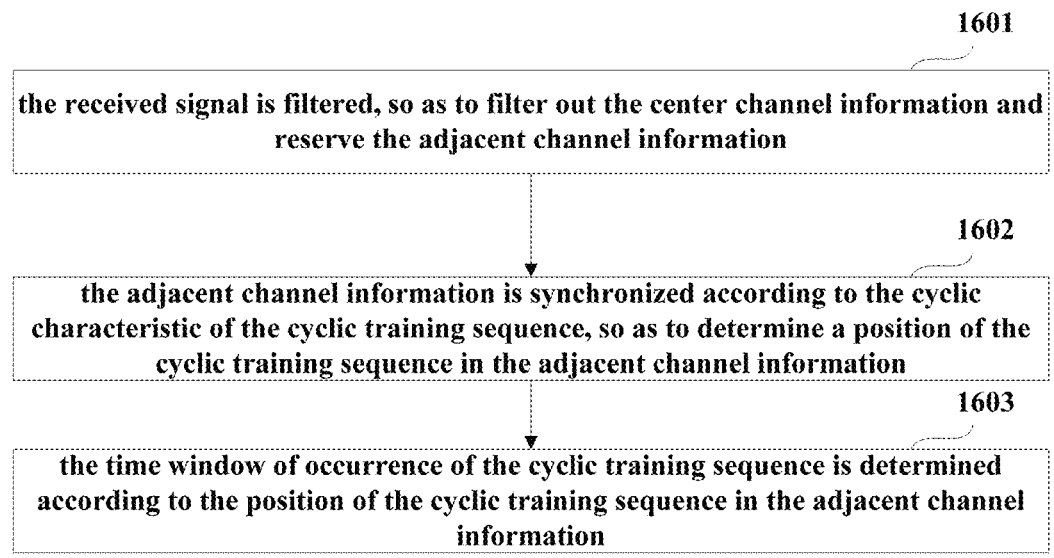
FIG. 16 is a schematic diagram of determining a time window of occurrence of a training sequence in the estimation method of Embodiment 2.

In step 1501, by performing synchronization on the cyclic training sequence in the adjacent channel, the time window of occurrence of the cyclic training sequence may be determined. FIG. 16 is a schematic diagram of an implementation of step 1501. As shown in FIG. 16, the method includes:

step 1601: the received signal is filtered, to filter out the center channel information and reserve the adjacent channel information;

step 1602: the adjacent channel information is synchronized according to the cyclic characteristic of the cyclic training sequence, to determine a position of the cyclic training sequence in the adjacent channel information; and step 1603: the time window of occurrence of the cyclic training sequence is determined according to the position of the cyclic training sequence in the adjacent channel information.

Figure 17:
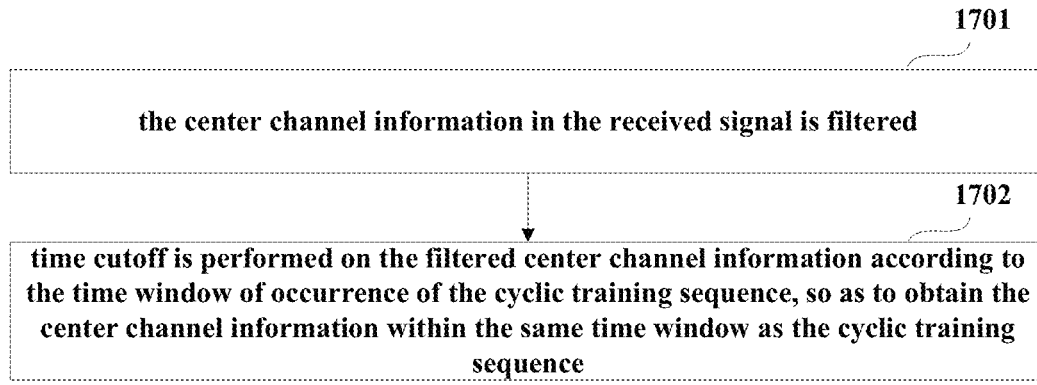
FIG. 17 is a schematic diagram of obtaining center channel information within the same time window as the adjacent channel training sequence in the estimation method of Embodiment 2.

In step 1502, by filtering the center channel, redundancy information may be deserted, and by performing time cutoff on the filtered signals, the center channel information within the same time window as the cyclic training sequence may be obtained. FIG. 17 is a schematic diagram of an implementation of step 1502. As shown in FIG. 17, the method includes:

step 1701: the center channel information in the received signal is filtered; and step 1702: time cutoff is performed on the filtered center channel information according to the time window of occurrence of the cyclic training sequence, to obtain the center channel information within the same time window as the cyclic training sequence.

In steps 1503 and 1701, an all-pass filter, or a matched filter, or a band-pass filter, may be used for filtering the above center channel information; however, it is not limited thereto. And types of filters used in steps 1503 and 1701 may be identical or different. In filtering the center channel information by using a band-pass filter, a windowing operation may be performed on the band-pass filter. For example, a windowing operation is performed on the band-pass filter by using a window function, the window function here may be a rectangular window, or a Kaiser window, or a Hamming window, or a Blackman window; however, it is not limited thereto. And window functions used by different band-pass filters may be identical or different. Hence, effects of information leaking into the center channel on a result of estimation of the linear crosstalk may be reduced.

Figure 18:
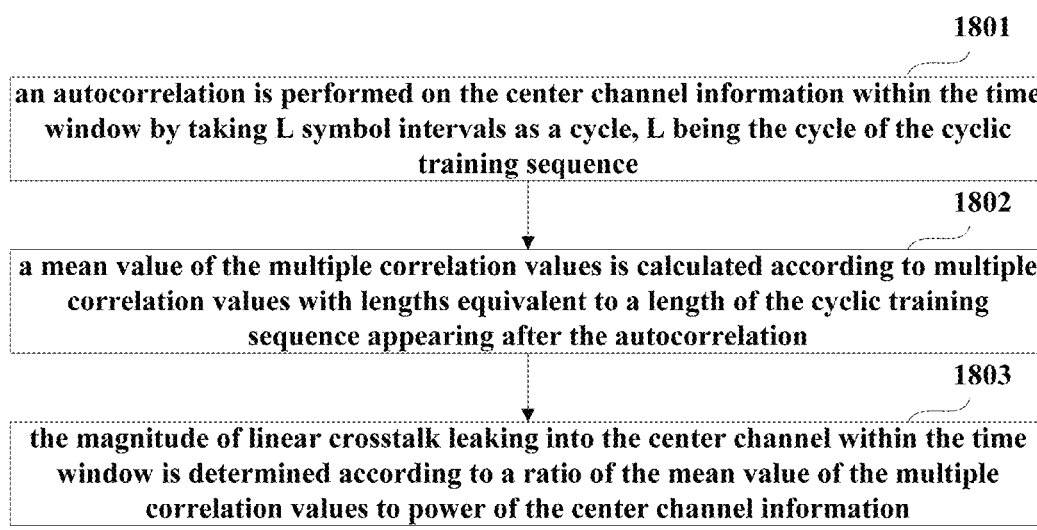
FIG. 18 is a schematic diagram of performing linear crosstalk estimation in the estimation method of Embodiment 2.

In step 1504, the magnitude of the linear crosstalk may be estimated by using the cyclic characteristic of the crosstalk signal. FIG. 18 is a schematic diagram of an implementation of step 1504. As shown in FIG. 18, the method includes:

step 1801: an autocorrelation is performed on the center channel information within the time window by taking L symbol intervals as a cycle, L being the cycle of the cyclic training sequence;

step 1802: according to a plurality of correlation values with lengths equivalent to a length of the cyclic training sequence appearing after the autocorrelation, calculating a mean value of the plurality of correlation values; and step 1803: the magnitude of linear crosstalk leaking into the center channel within the time window is determined according to a ratio of the mean value of the plurality of correlation values to power of the center channel information.

With the method of this embodiment, the center channel information is filtered, and the effective information that may be used for estimating the magnitude of the inter-channel linear crosstalk is reserved, thereby improving accuracy of estimation of the linear crosstalk.

Embodiment 3

Figure 19:
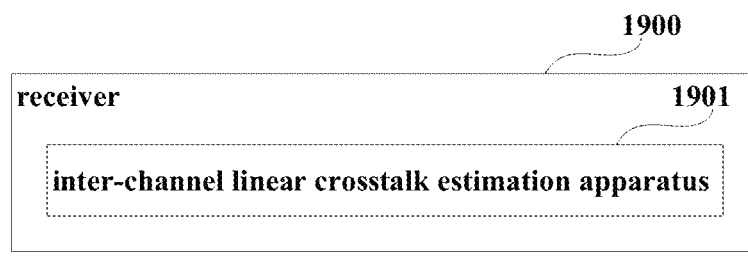
FIG. 19 is a schematic diagram of the receiver of Embodiment 3.

The embodiment of the present disclosure provides a receiver. FIG. 19 is a schematic diagram of a composition of the receiver. As shown in FIG. 19, the receiver 1900 includes the inter-channel linear crosstalk estimation apparatus 1901 described in Embodiment 1, the apparatus having the composition and functions of the inter-channel linear crosstalk estimation apparatus 200 described in Embodiment 1, the contents of which being incorporated herein, and being not going to be described herein any further.

With the receiver of this embodiment, the center channel information is filtered, and the effective information that may be used for estimating the magnitude of the inter-channel linear crosstalk is reserved, thereby improving accuracy of estimation of the linear crosstalk.

Embodiment 4

The embodiment of the present disclosure provides a communication system, including a transmitter, a receiver and an inter-channel linear crosstalk estimation apparatus, the inter-channel linear crosstalk estimation apparatus being connected to the receiver, and may be the inter-channel linear crosstalk estimation apparatus 200 described in Embodiment 1. As the composition and functions of the inter-channel linear crosstalk estimation apparatus 200 have been described in detail in Embodiment 1, its contents are incorporated herein, and shall not be described herein any further. In this embodiment, reference may be made to the related art for functions of the transmitter and the receiver, which shall not be described herein any further.

An embodiment of the present disclosure provides a computer readable program, which, when executed in an inter-channel linear crosstalk estimation apparatus, will cause the inter-channel linear crosstalk estimation apparatus to carry out the method as described in Embodiment 2.

An embodiment of the present disclosure provides a computer storage medium, including a computer readable program, which will cause an inter-channel linear crosstalk estimation apparatus to carry out the method as described in Embodiment 2.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method for feeding back channel state information carried out in the apparatus for feeding back channel state information or the method for allocating resources carried out in the apparatus for allocating resources described with reference to the embodiments of this disclosure may be directly embodied as hardware, software modules executed by a processor, or a combination thereof. For example, one or more functional block diagrams and/or one or more combinations of the functional block diagrams shown in FIG. 2 (such as the adjacent channel synchronizing unit, the time domain cutoff unit, the filtering unit, and the linear crosstalk estimating unit, etc.) may either correspond to software modules of procedures of a computer program, or correspond to hardware modules. Such software modules may respectively correspond to the steps shown in FIG. 15. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A non-transitory memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the accompanying drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the accompanying drawings may also be realized as a combination of computing equipment, such as a combination of a DSP and a microprocessor, a plurality of processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of the present disclosure containing the above embodiments, following supplements are further disclosed.

Supplement 1. An inter-channel linear crosstalk estimation method, including: estimating a magnitude of linear crosstalk leaking into a center channel by using information on a training sequence of an adjacent channel; wherein, the training sequence of the adjacent channel is a cyclic training sequence.

Supplement 2. The method according to supplement 1, wherein the method includes:

S1: synchronizing adjacent channel information inserted with a cyclic training sequence in a received signal, to determine a time window of occurrence of the cyclic training sequence;

S2: performing time cutoff on center channel information in the received signal according to the time window of occurrence of the cyclic training sequence, to obtain center channel information within the same time window as the cyclic training sequence;

S3: filtering the center channel information within the time window, and reserving center channel information containing linear crosstalk from an adjacent channel; and S4: estimating a magnitude of linear crosstalk leaking into the center channel by using a cyclic characteristic of the cyclic training sequence.

Supplement 3. The method according to supplement 2, wherein before S1, the method further includes:

S0: receiving a signal containing the center channel information and the adjacent channel information, the adjacent channel information having been inserted with the cyclic training sequence.

Supplement 4. The method according to supplement 3, wherein the cyclic training sequence consists of one or more sequence sections, each sequence section including a plurality of temporally repeated data symbols.

Supplement 5. The method according to supplement 4, wherein adjacent sequence sections are connected to each other in an end to end manner.

Supplement 6. The method according to supplement 2, wherein S1 includes: S11: filtering the received signal, to filter out the center channel information and reserve the adjacent channel information;

S12: synchronizing the adjacent channel information according to the cyclic characteristic of the cyclic training sequence, to determine a position of the cyclic training sequence in the adjacent channel information; and S13: determining the time window of occurrence of the cyclic training sequence according to the position of the cyclic training sequence in the adjacent channel information.

Supplement 7. The method according to supplement 2, wherein S2 includes:

S21: filtering the center channel information in the received signal; and

S22: performing time cutoff on the filtered center channel information according to the time window of occurrence of the cyclic training sequence, to obtain the center channel information within the same time window as the cyclic training sequence.

Supplement 8. The method according to supplement 7, wherein a filter used in S21 is identical to or different from a filter used in S3.

Supplement 9. The method according to supplement 8, wherein the filter used in S21 and the filter used in S3 include an all-pass filter, or a matched filter, or a band-pass filter.

Supplement 10. The method according to supplement 9, wherein in filtering the center channel information by using a band-pass filter, the method further includes:

performing a windowing operation on the band-pass filter by using a window function, the window function including a rectangular window, or a Kaiser window, or a Hamming window, or a Blackman window.

Supplement 11. The method according to supplement 2, wherein S4 includes:

S41: performing an autocorrelation on the center channel information within the time window by taking L symbol intervals as a cycle, L being the cycle of the cyclic training sequence;

S42: according to a plurality of correlation values with lengths equivalent to a length of the cyclic training sequence appearing after the autocorrelation, calculating a mean value of the plurality of correlation values; and S43: determining the magnitude of linear crosstalk leaking into the center channel within the time window according to a ratio of the mean value of the plurality of correlation values to power of the center channel information.

What is claimed is:

1. An inter-channel linear crosstalk estimation apparatus, comprising:
   a memory that stores a plurality of instructions; and
   a processor coupled to the memory and configured to execute the instructions to:
   synchronize adjacent channel information inserted with a cyclic training sequence in a received signal, to determine a time window of occurrence of the cyclic training sequence;
   perform time cutoff on center channel information in the received signal in a center channel according to the time window of occurrence of the cyclic training sequence, to obtain center channel information within a same time window as the cyclic training sequence;
   filter the center channel information within the time window, and reserve center channel information containing linear crosstalk from an adjacent channel; and
   estimate a magnitude of linear crosstalk leaking into the center channel by using a cyclic characteristic of the cyclic training sequence.

2. The apparatus according to claim 1, wherein the processor further configured to execute the instructions to:
   receive a signal containing the center channel information and the adjacent channel information, the adjacent channel information having been inserted with the cyclic training sequence.

3. The apparatus according to claim 2, wherein the cyclic training sequence includes one or more sequence sections, each sequence section comprising a plurality of temporally repeated data symbols.

4. The apparatus according to claim 3, wherein adjacent sequence sections are connected to each other in an end to end manner.

5. The apparatus according to claim 1, wherein in synchronizing adjacent channel information, the processor is configured to execute the instructions to:
   filter the received signal, to filter out the center channel information and reserve the adjacent channel information;
   synchronize the adjacent channel information according to the cyclic characteristic of the cyclic training sequence, to determine a position of the cyclic training sequence in the adjacent channel information; and
   determine the time window of occurrence of the cyclic training sequence according to the position of the cyclic training sequence in the adjacent channel information.

6. The apparatus according to claim 1, wherein in performing time cutoff on center channel information, the processor configured to execute the instructions to:
   filter the center channel information in the received signal; and
   perform time cutoff on the filtered center channel information according to the time window of occurrence of the cyclic training sequence, to obtain the center channel information within the same time window as the cyclic training sequence.

7. The apparatus according to claim 6, wherein a filter used in the filtering of the center channel information in the received signal is one of identical to and different from a filter used in the filtering of the center channel information with respect to type, and comprises one of an all-pass filter, a matched filter, and a band-pass filter.

8. The apparatus according to claim 7, wherein in filtering the center channel information by using a band-pass filter, the processor is configured to execute the instructions to perform a windowing operation on the band-pass filter by using a window function, the window function comprising one of a rectangular window, a Kaiser window, a Hamming window, and a Blackman window.

9. The apparatus according to claim 1, wherein in estimating the magnitude of linear crosstalk, the processor configured to execute the instructions to:
 perform an autocorrelation on the center channel information within the time window by using L symbol intervals as a cycle, L being the cycle of the cyclic training sequence;
 according to a plurality of correlation values with lengths equivalent to a length of the cyclic training sequence appearing after the autocorrelation, calculate a mean value of the plurality of correlation values; and
 determine the magnitude of linear crosstalk leaking into the center channel within the time window according to a ratio of the mean value of the plurality of correlation values to power of the center channel information.

10. An inter-channel linear crosstalk estimation method, comprising:
 estimating a magnitude of linear crosstalk leaking into a center channel by using information on a training sequence of an adjacent channel; wherein, the training sequence of the adjacent channel is a cyclic training sequence,
 wherein the method includes:
  synchronizing adjacent channel information inserted with a cyclic training sequence in a received signal, to determine a time window of occurrence of the cyclic training sequence;
  performing time cutoff on center channel information in the received signal according to the time window of occurrence of the cyclic training sequence, to obtain center channel information within a same time window as the cyclic training sequence;
  filtering the center channel information within the time window, and reserving center channel information containing linear crosstalk from an adjacent channel; and
  estimating a magnitude of linear crosstalk leaking into the center channel by using a cyclic characteristic of the cyclic training sequence.

11. The method according to claim 10, wherein before the synchronizing adjacent channel information, the method further includes:
 receiving a signal containing the center channel information and the adjacent channel information, the adjacent channel information having been inserted with the cyclic training sequence.

12. The method according to claim 11, wherein the cyclic training sequence includes one or more sequence sections, each sequence section including a plurality of temporally repeated data symbols.

13. The method according to claim 12, wherein adjacent sequence sections are connected to each other in an end to end manner.

14. The method according to claim 10, wherein the synchronizing of adjacent channel information includes:
 filtering the received signal, to filter out the center channel information and reserve the adjacent channel information;
 synchronizing the adjacent channel information according to the cyclic characteristic of the cyclic training sequence, to determine a position of the cyclic training sequence in the adjacent channel information; and
 determining the time window of occurrence of the cyclic training sequence according to the position of the cyclic training sequence in the adjacent channel information.

15. The method according to claim 10, wherein the performing of the time cutoff includes:
 filtering the center channel information in the received signal; and
 performing time cutoff on the filtered center channel information according to the time window of occurrence of the cyclic training sequence, to obtain the center channel information within the same time window as the cyclic training sequence.

16. The method according to claim 15, wherein a filter used in the filtering of the center channel information in the received signal is one of identical to and different from a filter used in the filtering of the center channel information.

17. The method according to claim 16, wherein the filter used in the filtering of the center channel information in the received signal and the filter used in the filtering of the center channel information include one of an all-pass filter, a matched filter, and a band-pass filter.

18. The method according to claim 17, wherein in filtering the center channel information by using a band-pass filter, the method further includes:
 performing a windowing operation on the band-pass filter by using a window function, the window function including one of a rectangular window, a Kaiser window, a Hamming window, and a Blackman window.

19. The method according to claim 10, wherein the estimating of the magnitude of linear crosstalk includes:
 performing an autocorrelation on the center channel information within the time window by taking L symbol intervals as a cycle, L being the cycle of the cyclic training sequence;
 according to a plurality of correlation values with lengths equivalent to a length of the cyclic training sequence appearing after the autocorrelation, calculating a mean value of the plurality of correlation values; and
 determining the magnitude of linear crosstalk leaking into the center channel within the time window according to a ratio of the mean value of the plurality of correlation values to power of the center channel information.

* * * * *